(12) United States Patent
Hilton et al.

(10) Patent No.: US 7,342,334 B2
(45) Date of Patent: Mar. 11, 2008

(54) INSULATED STATOR WITH WIRE ROUTING ELEMENT

(75) Inventors: Daniel E Hilton, St. Louis, MO (US); Kent A Sheeran, Festus, MO (US); Gary E Horst, Manchester, MO (US)

(73) Assignee: Emerson Electric Co., St. Louis, MO (US)

( * ) Notice: Subject to any disclaimer, the term of this patent is extended or adjusted under 35 U.S.C. 154(b) by 263 days.

(21) Appl. No.: 10/977,252

(22) Filed: Oct. 29, 2004

(65) Prior Publication Data

US 2006/0091739 A1 May 4, 2006

(51) Int. Cl.
*H02K 3/50* (2006.01)
*H02K 15/12* (2006.01)
*H02K 3/34* (2006.01)

(52) U.S. Cl. .......................... 310/71; 310/45; 310/254; 310/194

(58) Field of Classification Search ................ 310/45, 310/71, 44, 194, 254
See application file for complete search history.

(56) References Cited

U.S. PATENT DOCUMENTS

| | | | |
|---|---|---|---|
| 2,892,111 A | 6/1959 | Young, Jr. | |
| 3,495,109 A * | 2/1970 | Ames | 310/71 |
| 3,984,712 A * | 10/1976 | Hill | 310/71 |
| 4,287,446 A * | 9/1981 | Lill et al. | 310/71 |
| 4,481,435 A * | 11/1984 | Loforese | 310/71 |
| 4,813,248 A | 3/1989 | Smith et al. | |
| 4,835,839 A | 6/1989 | Forbes et al. | 29/596 |
| 5,040,285 A | 8/1991 | Williams et al. | |
| 5,150,589 A | 9/1992 | Williams et al. | |
| 5,173,628 A * | 12/1992 | Yoshida et al. | 310/71 |
| 5,266,855 A | 11/1993 | Smith et al. | 310/90 |
| 5,353,613 A | 10/1994 | Smith et al. | |
| 5,508,578 A * | 4/1996 | Suzuki et al. | 310/254 |
| 5,519,271 A * | 5/1996 | Sakashita et al. | 310/71 |
| 5,576,620 A | 11/1996 | Cheong | |
| 5,619,871 A | 4/1997 | Forbes et al. | |
| 5,682,686 A | 11/1997 | Condini | |
| 5,717,273 A | 2/1998 | Gulbrandson et al. | |
| 5,751,089 A | 5/1998 | Stridsberg | 310/266 |
| 5,778,703 A | 7/1998 | Imai et al. | |
| 5,809,809 A | 9/1998 | Neumann | |
| 5,864,193 A | 1/1999 | Katoh | 310/214 |
| 5,894,746 A | 4/1999 | Skrippek | |
| 5,907,206 A | 5/1999 | Shiga et al. | |
| 5,918,360 A | 7/1999 | Forbes et al. | |
| 5,962,938 A | 10/1999 | Bobay et al. | |
| 5,986,379 A | 11/1999 | Hollenbeck et al. | |
| 5,996,379 A | 12/1999 | Skrippek | |

(Continued)

FOREIGN PATENT DOCUMENTS

EP 1 241 774 A 9/2002

(Continued)

*Primary Examiner*—Burton Mullins
(74) *Attorney, Agent, or Firm*—Harness, Dickey & Pierce, P.L.C.

(57) ABSTRACT

A stator for an electric machine includes stator teeth with powder coat insulation covering a portion of each tooth. An end cap with a routing element is positioned on one side of the stator. Wire extends around and contacts the powder coat insulation on the stator teeth and is routed via the routing element.

24 Claims, 5 Drawing Sheets

U.S. PATENT DOCUMENTS

| | | | |
|---|---|---|---|
| 6,041,625 A | 3/2000 | Nagai et al. | |
| 6,049,930 A | 4/2000 | Hisano et al. | |
| 6,050,113 A | 4/2000 | Skrippek et al. | |
| 6,093,984 A | 7/2000 | Shiga et al. | |
| 6,121,711 A | 9/2000 | Nakahara | 310/254 |
| 6,127,760 A * | 10/2000 | Nagasaki et al. | 310/254 |
| 6,131,422 A | 10/2000 | Skrippek et al. | |
| 6,137,198 A * | 10/2000 | Kawamura | 310/71 |
| 6,148,647 A | 11/2000 | Kabeya et al. | |
| 6,166,474 A | 12/2000 | Kohara et al. | |
| 6,181,047 B1 | 1/2001 | Nitta | 310/254 |
| 6,239,532 B1 | 5/2001 | Hollenbeck et al. | |
| 6,265,804 B1 | 7/2001 | Nitta et al. | |
| 6,322,629 B1 * | 11/2001 | Okada et al. | 118/503 |
| 6,332,343 B1 | 12/2001 | Koketsu et al. | |
| 6,351,042 B1 | 2/2002 | Takayanagi | 310/43 |
| 6,370,761 B2 | 4/2002 | Shiga et al. | |
| 6,396,177 B1 | 5/2002 | Shin et al. | |
| 6,396,190 B1 | 5/2002 | Ahn et al. | |
| 6,429,557 B2 * | 8/2002 | Sheeran et al. | 310/71 |
| 6,448,725 B1 | 9/2002 | Cho et al. | |
| 6,460,382 B1 | 10/2002 | Kim et al. | |
| 6,470,984 B1 * | 10/2002 | Nakajima et al. | 180/65.2 |
| 6,474,114 B1 | 11/2002 | Ito et al. | |
| 6,477,869 B2 | 11/2002 | Heyder et al. | |
| 6,492,749 B1 | 12/2002 | Shiga et al. | |
| 6,492,758 B1 | 12/2002 | Gianni et al. | |
| 6,499,209 B1 | 12/2002 | Landin et al. | |
| 6,499,323 B2 | 12/2002 | Skrippek et al. | |
| 6,510,716 B1 | 1/2003 | Kim et al. | |
| 6,532,645 B1 | 3/2003 | Becherucci et al. | 29/596 |
| 6,626,014 B2 | 9/2003 | Heyder et al. | |
| 6,655,177 B2 | 12/2003 | Bierbach et al. | |
| 6,657,328 B2 | 12/2003 | Shiga et al. | |
| 6,744,157 B2 | 6/2004 | Choi et al. | |
| 6,744,166 B2 | 6/2004 | Harter | 310/214 |
| 6,914,363 B2 | 7/2005 | Kim et al. | |
| 6,993,822 B2 | 2/2006 | Park et al. | |
| 7,042,120 B2 | 5/2006 | Lim et al. | |
| 7,076,975 B2 | 7/2006 | Heyder et al. | |
| 7,135,799 B2 * | 11/2006 | Rittmeyer | 310/180 |
| 2002/0000108 A1 | 1/2002 | Heyder et al. | |
| 2002/0053225 A1 | 5/2002 | Bierbach et al. | |
| 2002/0069679 A1 | 6/2002 | Skrippek et al. | |
| 2002/0113519 A1 | 8/2002 | Brown | |
| 2003/0006665 A1 | 1/2003 | Kim et al. | |
| 2004/0055143 A1 | 3/2004 | Kim et al. | |
| 2004/0163428 A1 | 8/2004 | Kim et al. | |
| 2005/0016228 A1 | 1/2005 | Bergemann et al. | |
| 2005/0028566 A1 | 2/2005 | Kim et al. | |
| 2005/0028567 A1 | 2/2005 | Kim et al. | |
| 2005/0057108 A1 | 3/2005 | Kim et al. | |
| 2005/0144990 A1 | 7/2005 | Kim et al. | |
| 2005/0146235 A1 | 7/2005 | Kim et al. | |
| 2005/0189837 A1 | 9/2005 | Lee | |
| 2005/0189838 A1 | 9/2005 | Lee | |
| 2005/0194859 A1 | 9/2005 | Lee | |
| 2005/0194860 A1 | 9/2005 | Lee | |
| 2005/0200225 A1 | 9/2005 | Kim et al. | |
| 2005/0237022 A1 | 10/2005 | Kim et al. | |
| 2005/0269979 A1 | 12/2005 | Min et al. | |
| 2006/0010612 A1 | 1/2006 | Kim et al. | |
| 2006/0091754 A1 | 5/2006 | Kim et al. | |
| 2006/0101865 A1 | 5/2006 | Jeon et al. | |
| 2006/0103253 A1 | 5/2006 | Shiga et al. | |
| 2006/0108887 A1 | 5/2006 | Nitta et al. | |
| 2006/0119204 A1 | 6/2006 | Awazu et al. | |

FOREIGN PATENT DOCUMENTS

| | | | |
|---|---|---|---|
| FR | 2 837 632 A | | 9/2003 |
| JP | 60-032534 | * | 2/1985 |
| JP | 04-185253 | * | 7/1992 |
| JP | 10-290539 | * | 10/1998 |
| JP | 2003-158845 | * | 5/2003 |
| JP | 2003-219593 | * | 7/2003 |

* cited by examiner

INSULATED STATOR WITH WIRE ROUTING ELEMENT

FIELD OF THE INVENTION

The present invention relates to electric machines, and more particularly, to insulating and routing wire on a stator for electric machines.

BACKGROUND

A wide variety of electric machines are known that include a wire wound around a tooth of a stator to form a stator pole. To decrease electrical leakage and surface currents due to the electrical magnetization of the pole by the wire windings, each tooth is typically covered by an insulating material prior to the winding of the wire. The insulating material is often cardboard or another similar bulky material or fabric. Various techniques are known for insulting the wire from the body of the stator and for routing the wire on the stator.

For example, an inner stator is known to have each tooth, or portions thereof, covered by a cardboard, cardboard like, or plastic insulating structure. A wire is wound around each tooth covering the insulating structure. It is also known that an end cap can have features or extensions to provide insulation between the wire and the stator body. In some cases, a combination of end cap extensions and a separate insulating material is used to insulate the wire from the stator body.

In some stator arrangements, an end cap is configured for attachment to both sides of a stator. For example, one or both of a plastic end cap may include plastic protrusions that correspond to each stator tooth and having a combined length for the particular stator body thickness. In such arrangements, when both end caps are positioned on the stator body, the plastic protrusions cover the walls of the stator teeth and both faces. As such, the wound wire covers portions of the end cap covering the teeth and does not contact the stator body.

SUMMARY OF THE INVENTION

The inventors have succeeded at designing new ways of insulting stators for electrical machines such as electric motors, generators, and other dynamoelectric machines. This includes using powder coat insulation and a wire routing device. In many cases, these techniques can be readily applied to stators having a variety of thicknesses. In some cases, these techniques provide improved heat dissipation, reduced coil sizes, and/or reduced wire length.

According to one aspect of the invention, a method of manufacturing a stator having stator teeth includes powder coating a portion of each tooth of the stator. An end cap with a routing element is positioned to one side of the stator and a wire is wound around each tooth such that the wire contacts the powder coated portion of each tooth. The wire is routed using a routing element of the end cap.

According to another aspect of the invention, a stator for an electric machine includes stator teeth with wire extending around each tooth. A means for insulating the wire from the stator teeth is included along with a means for routing the wire.

According to yet another aspect of the invention, a stator for an electric machine includes stator teeth with powder coat insulation covering a portion of each tooth. An end cap with a routing element is positioned on one side of the stator. Wire extends around and contacts the powder coat insulation on the stator teeth and is routed via the routing element.

According to still another aspect of the invention, an electric machine has an outer rotor and an inner stator. The stator includes teeth having tooth walls. A powder coat insulation covers a portion of each tooth including the tooth walls. An end cap having a wire routing element is positioned on one side of the stator. Wire extends around and contacts the powder coat insulation on the teeth and is routed by the wire routing element.

Further aspects of the invention will be in part apparent and in part pointed out from the figures and detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

Embodiments of the invention will become more fully understood from the detailed description and the accompanying drawings.

Corresponding reference characters indicate corresponding elements throughout the several views of the drawings. The following description is merely exemplary in nature and is not intended to limit the invention, its applications, or uses.

DETAILED DESCRIPTION OF EXEMPLARY EMBODIMENTS

One aspect of the invention is a method of manufacturing a stator having stator teeth. A portion of each tooth is powder coated. An end cap with a routing element is positioned to one side of the stator and wire is wound around each tooth such that the wire contacts the powder coated portion of each tooth. The wire is routed using a routing element of the end cap. The method can also include terminating the wire on a wire coupling element of the end cap. A second end cap can also be positioned on a second side of the stator.

Figure 1:
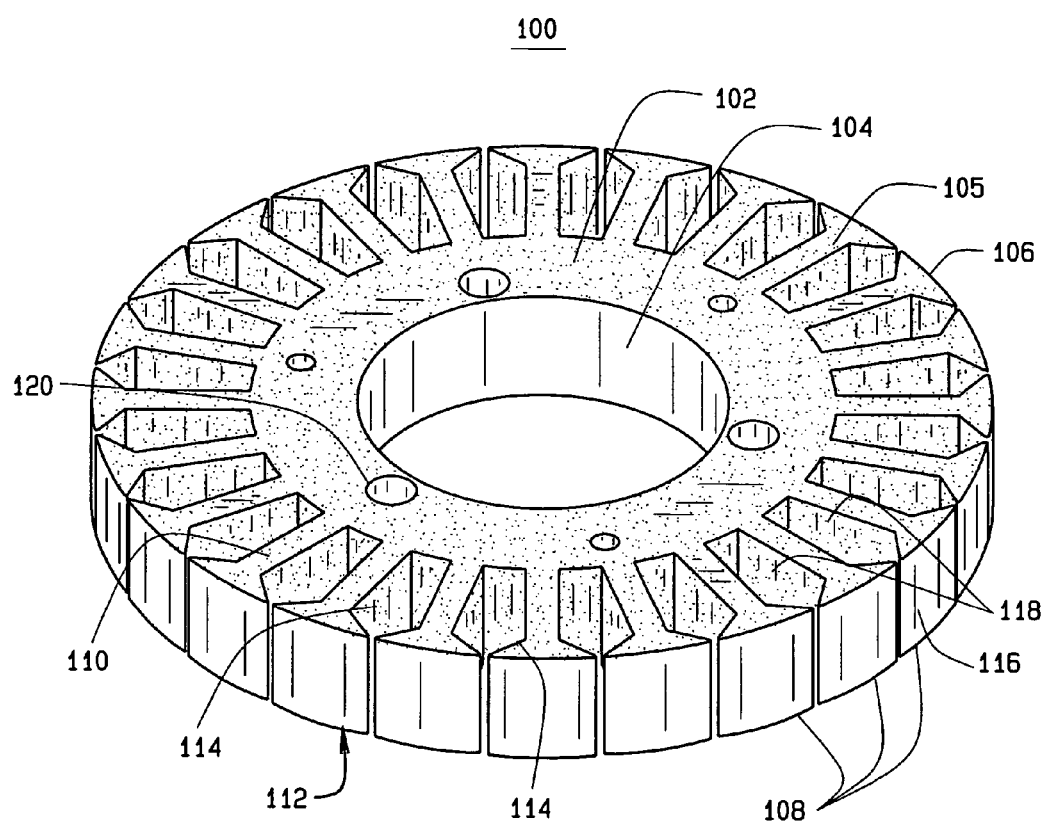
FIG. 1 is an isometric view of a stator body according to one embodiment of the invention.
Figure 2:
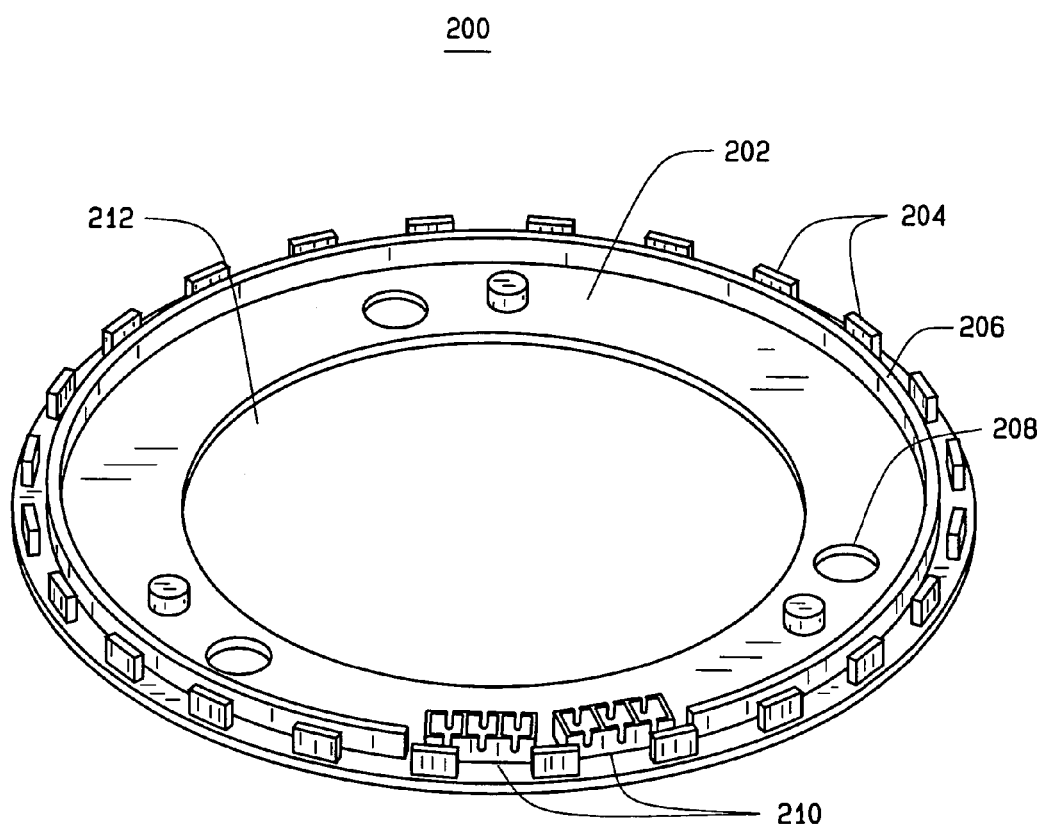
FIG. 2 is an isometric view of an end cap having a wire routing element according to another embodiment of the invention.
Figure 3:
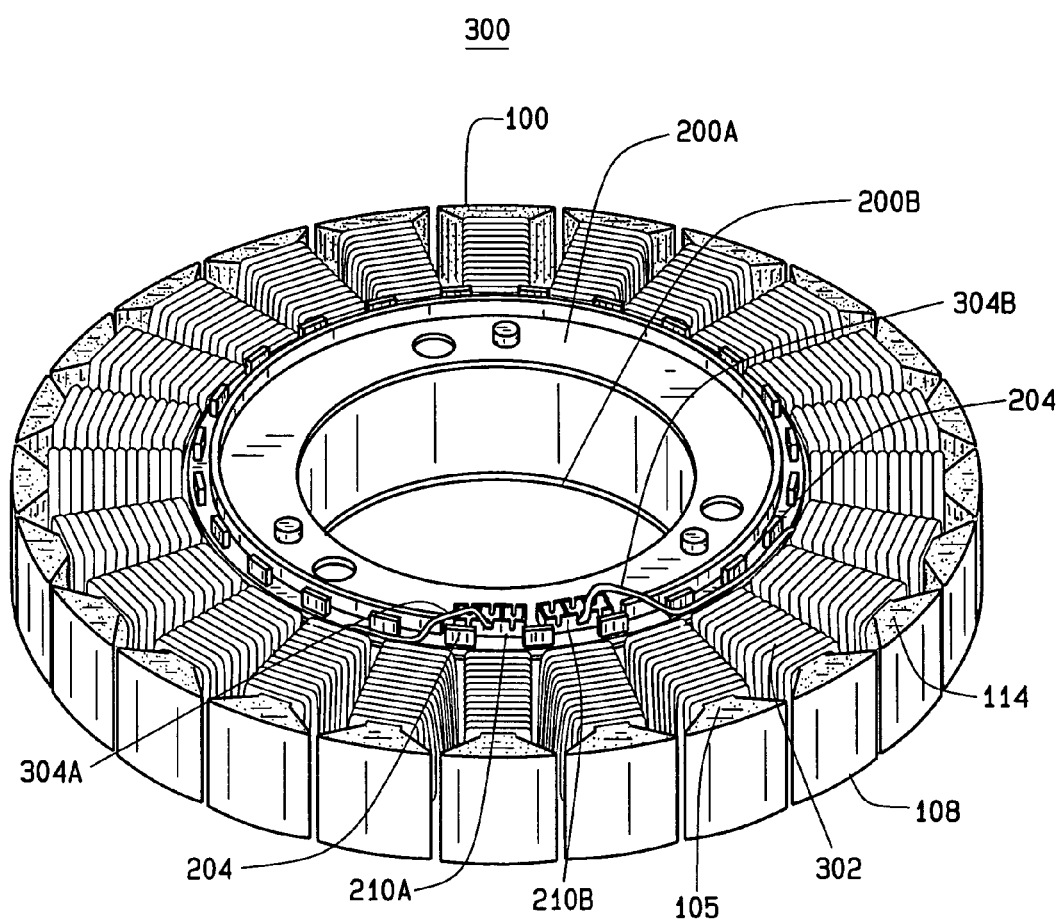
FIG. 3 is a perspective view of an assembled stator according to another embodiment of the invention.
Figure 4:
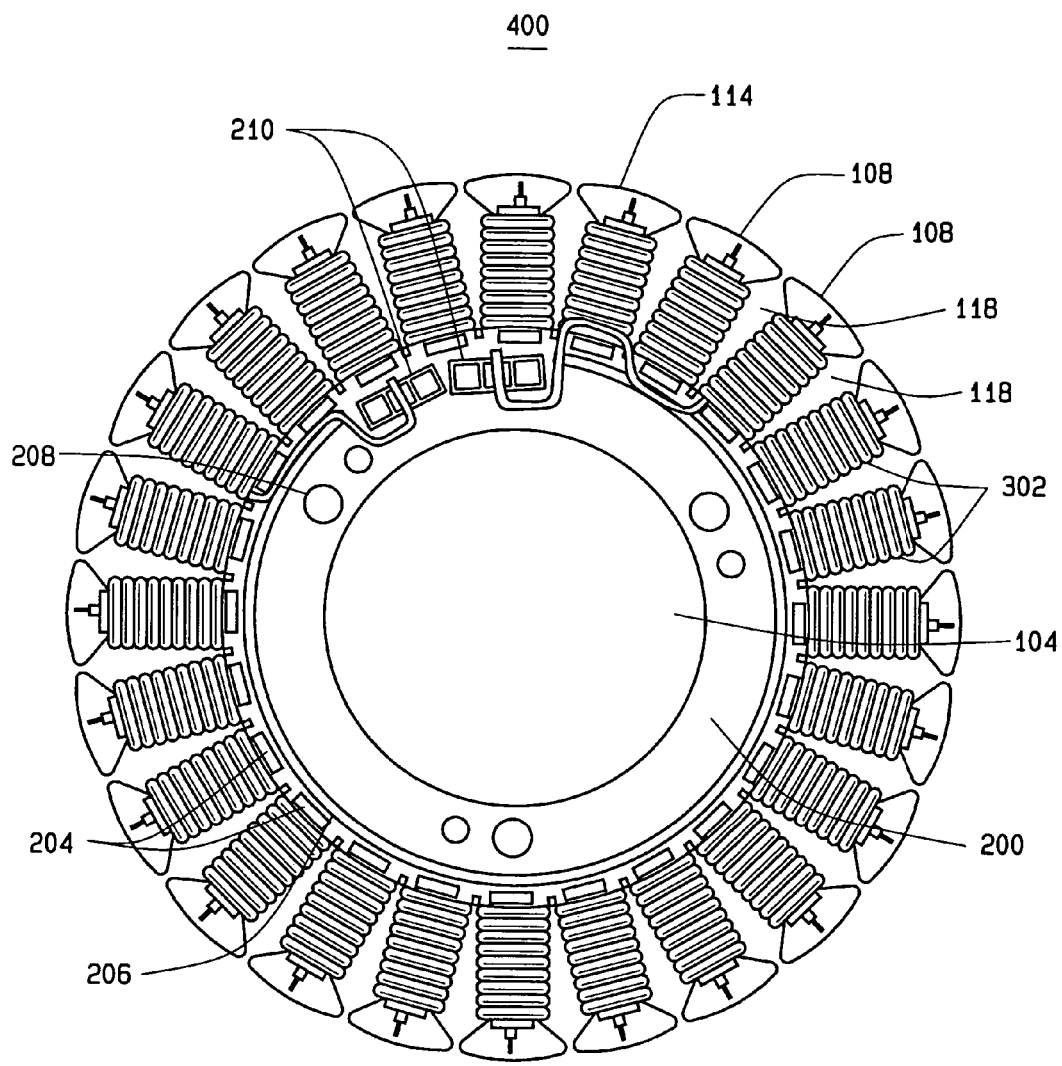
FIG. 4 is an isometric top view of a stator according to another embodiment of the invention.

In another aspect, a stator for an electric machine includes stator teeth with powder coat insulation covering a portion of each tooth. An end cap with a routing element is positioned on one side of the stator. Wire extends around and contacts the powder coat insulation on the stator teeth and is routed via the routing element. Various exemplary embodiments of a stator will now be addressed with reference to FIGS. 1, 2 3, and 4. FIG. 1 illustrates one embodiment of a stator body having a portion with a powder coat finish. FIG. 2 illustrates one embodiment of an end cap having a plurality of routing elements. FIGS. 3 and 4 illustrate two embodiments of a stator with a powder coated finish on portions of each stator tooth and at least one end cap having a plurality of routing elements.

Referring now to FIG. 1, a stator 100 has a stator body 102 with a plurality of stator teeth 105 formed on a perimeter 108. As illustrated, each tooth 105 can include a tooth crown 106 having an arc length greater than a substantial portion of a radial length of the tooth 105. The stator body 102 has a top side and a bottom side and a perimeter stator face 116 defining a perimeter 108 of the stator body 102. The plurality of outer surfaces 112 of each tooth crown 106 forms the perimeter stator face 116. Each tooth 105 also has a radial length defining a tooth wall 118 facing an adjacent tooth 105. A tooth cavity 114 or slot is formed between two adjacent teeth 105 and is defined by two opposing tooth walls 118. The stator body 102 can be a solid or monolithic iron or metallic structure or may be a stack of laminations or layers of magnetically conductive material.

A powder coat finish 110 covers a portion of the exterior of the stator body 102 including a portion of each tooth 105. The powder coated portion 110 may include the top and bottom sides of each tooth and/or the tooth walls 118. In one embodiment, the powder coat 110 covers the entire exterior of the stator body 102 and in another embodiment the powder coat 110 covers the entire exterior of the stator body 102 with the exception of the perimeter stator face 116. As such, in some embodiments the powder coat finish 110 does not cover the outer crown surface 112. The powder coat finish 110 can, in some embodiments, cover all or a portion of an inner surface of shaft hole 104. The powder coat finish 110 provides an insulated covering to the stator body 102 and/or the tooth 105 without adding significant additional bulk or size to the stator body 102 or tooth 105. In particular, the powder coat finish 110 provides insulation between the tooth 105 or the stator body 102 and a wire wound around the tooth 105 without the need for further or auxiliary insulating structure or material.

As illustrated in this exemplary embodiment, the stator body 102 defines a shaft hole 104. The stator 100 can also include one or more stator mounting features for mounting the stator in an electric machine application. As shown by way of example in FIG. 1, the stator body 102 includes mounting holes 120 configured for mounting the stator body 102 in one particular electric machine application mounting arrangement.

Referring now to FIG. 2, an end cap 200 includes an end cap body 202. The end cap body 202 can be a non-conducting material such as plastic or a composite material. One or more wire routing elements provide for the routing of wire. Two embodiments of the wire routing element are illustrated as a channel guide 206 and a prong 204 located around an outer perimeter of the end cap body 202. In other embodiments, the routing element can also include one or more tines, slots, channels, protrusions, and/or clips. The end cap 202 can also include a wire coupling element 210 such as an electrical connector or insulation displacement connector terminal (IDCT) as illustrated in FIG. 2. The wire coupling element 210 is configured to terminate one or more stator wires and can be configured for electrically interfacing to a wire connector associated with an electric machine.

Figure 5:
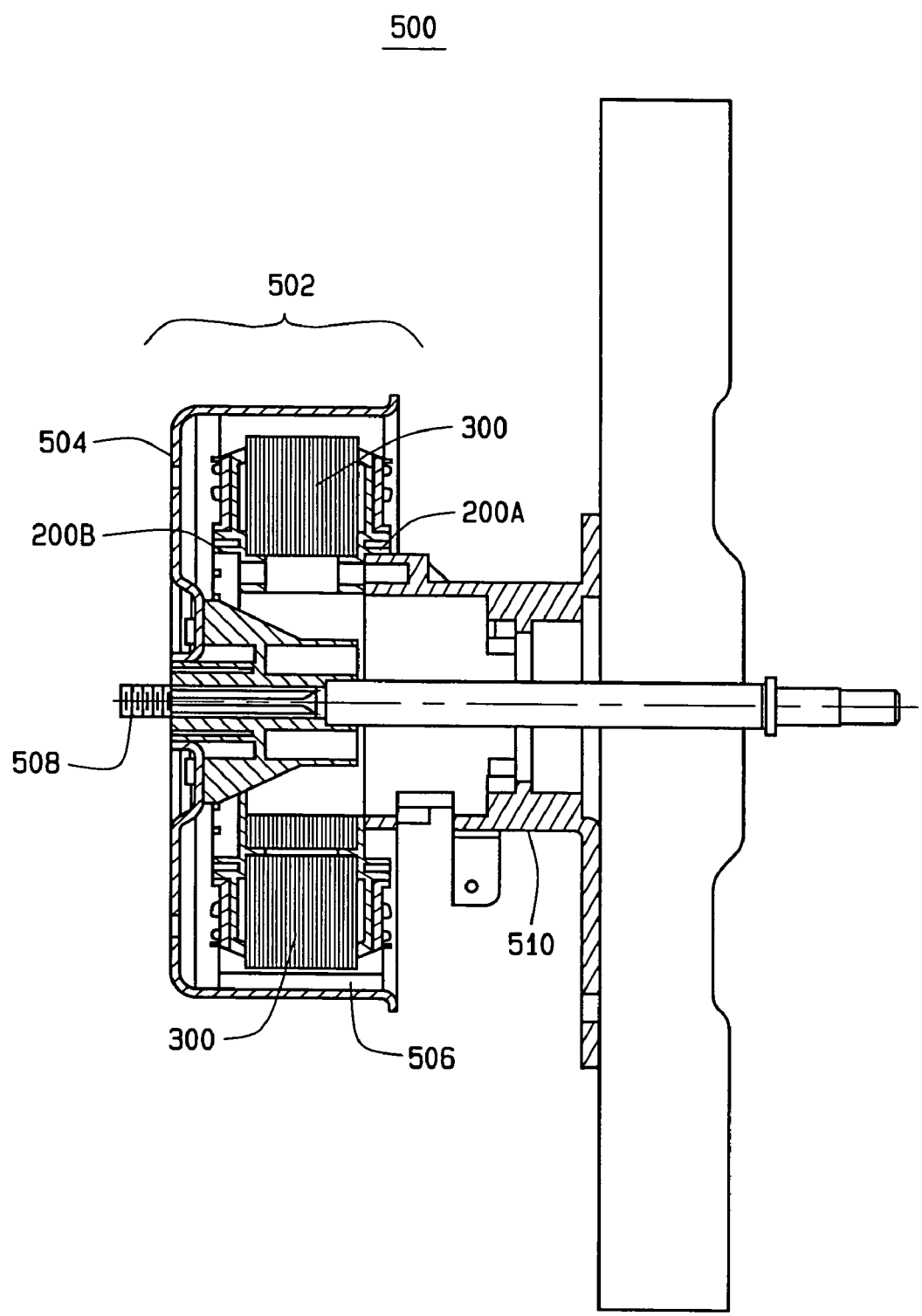
FIG. 5 is a sectional view of an electric machine according to another embodiment of the invention.

In some embodiments, the end cap body 202 defines an end cap shaft hole 212 for insertion of a shaft (shown by way of example in FIG. 5). The end cap shaft hole 212 can correspond to stator hole 104. The end cap body 202 also defines one or more mounting features for mounting the end cap 200 to an electrical machine or an electric machine application. As shown in FIG. 2, the mounting feature may be an end cap mounting hole 208. For example, the end cap mounting hole 208 can align with the stator mounting hole 120 when assembled. In operation, such a mounting arrangement provides for coupling the end cap 200 between the stator body 102 and a stator mounting of the electric machine or its application (as shown by way of example in FIG. 5). In another embodiment, a first and a second end cap 200 are positioned on the two opposing sides of the stator body 102 in an assembled stator (as shown by way of example in FIG. 3). As illustrated in FIG. 2, the end cap 200 is configured to only cover a portion of a side of a stator body 102. In other embodiments, the end cap 200 can be configured to cover a portion or all of an interior surface of the stator shaft hole 104 thereby electrically isolating stator body 102 from a shaft positioned within the shaft hole 104.

Referring now to FIGS. 3 and 4, a stator 300 and/or 400 includes the stator 100 and two end caps 200A and 200B positioned on opposite sides of the stator 100. In one embodiment, end caps 200A and 200B are identical. In another embodiment, only end cap 200A includes one or more routing elements such as prongs 204 and channel guide 206 and/or one or more wire coupling elements 210A and 210B. Referring again to FIGS. 3 and 4, one or more wires 302 are wound around the radial length of each tooth 105. The wire 302 is wound onto each tooth 105 contacting the portions of the stator 100 having powder coat 110 insulation. As shown, the wire 302 includes wire leads 304A and 304B. However, in other embodiments a different number of wire leads 304 can be present. As illustrated in FIG. 3, the wire lead 304A is routed by one or more wire management prongs 204 and the channel guide 206 and electrically terminated on the wire coupling element 210A. Similarly, the wire lead 304B is routed by the prongs 204 and the channel guide 206, and is electrically terminated on the coupling element 210B. When energized by an external energy source (not shown), the wire 302 and the corresponding tooth 105 create a magnetized stator pole of the stator 300.

The stator 300 can be mounted in an electric machine or an electric machine application such that one or both end caps 200A and 200B provide electrical isolation of the stator 300. One such embodiment of an electric machine 500 is illustrated in FIG. 5. As illustrated, a rotor and stator assembly 502 is formed by enclosing the inner stator 300 within an outer rotor 504. The outer rotor 504 includes a plurality of permanent magnets 506 that form rotor poles. The stator 300 has the powder coat insulation 110 (not shown) over portions of the stator teeth 105 (not shown). The end caps 200A and 200B provide the routing of wire 302 (not shown). The electric machine 500 includes a shaft 508 and a stator mounting 510. The stator 300 and the rotor 504 are positioned about shaft 508. In this illustrated embodiment, the rotor 504 is coupled to the shaft 508 for rotational operation of the electric machine 500. The stator 300 is mounted to the stator mounting 510 such that the end cap 200A electrically isolates the stator 300 from the stator mounting 510.

While the illustrated embodiments provided herein describe an inner stator for use in an electric machine having an outer rotor, other embodiments of the invention include an outer stator for use in an electric machine having an inner rotor.

One or more embodiments of the invention as described herein provide for an improved design of an inner stator and for an electric machine such as a motor, generator, or dynamoelectric machine. Some embodiments provide an improved stator design and/or improved manufacturing and assembly of the stator 300. For example, some embodiments may provide for interchangeable end caps for various thicknesses of stators, improved heat dissipation of the stator, reduced quantity of wire required for a particular torque output, and/or reduced stator thickness to provide an equivalent torque output.

When introducing embodiments and aspects of the invention, the articles "a", "an", "the", and "said" are intended to mean that there are one or more of the elements. The terms "comprising", "including", and "having" are intended to be inclusive and mean that there may be additional elements other than the listed elements.

In view of the above, it has been shown that the exemplary embodiments of the invention provide advantageous results. As various changes could be made in the above exemplary constructions and methods without departing from the scope of the invention, it is intended that all matter contained in the above description or shown in the accompanying drawings shall be interpreted as illustrative and not in a limiting sense.

It is further to be understood that the steps described herein are not to be construed as necessarily requiring their performance in the particular order discussed or illustrated. It is also to be understood that additional or alternative steps may be employed.

What is claimed is:

1. A stator for an electric machine, the stator comprising a plurality of stator teeth, each tooth including a top side and a bottom side, powder coat insulation covering the top and bottom sides of each tooth, an end cap positioned on one side of the stator, the end cap including a channel guide and at least one routing element spaced radially outward from the channel guide, and wire extending around and contacting the powder coat insulation on the top and bottom sides of at least one stator tooth and routed via the channel guide and the at least one routing element, wherein the at least one routing element includes a prong.

2. The stator of claim 1 wherein each stator tooth includes opposing tooth walls extending between the top and bottom sides, the tooth walls of adjacent teeth defining slots and wherein the powder coat insulation covers the tooth walls.

3. The stator of claim 1 wherein the powder coat insulation covers a first side and a second side of a body of the stator from which the stator teeth radially extend.

4. The stator of claim 1 wherein the end cap is a first end cap, the stator further comprising a second end cap coupled to a second side of the stator.

5. The stator of claim 4 wherein the second end cap is substantially identical to the first end cap.

6. The stator of claim 1 wherein the stator is an interior stator.

7. The stator of claim 1 wherein the end cap includes a wire coupling terminal electrically coupled to the wire and adapted to connect to a wire connector of the electric machine.

8. The stator of claim 7 wherein the wire coupling terminal is positioned between opposite ends of the channel guide.

9. The stator of claim 1 wherein the end cap includes a plurality of routing elements spaced radially outward from the channel guide.

10. The stator of claim 9 wherein the plurality of routing elements include a plurality of prongs.

11. The stator of claim 10 wherein the end cap further includes at least one wire coupling terminal.

12. The stator of claim 1 wherein the end cap includes an outer perimeter and the channel guide extends along at least a portion of said outer perimeter.

13. An electric machine comprising an outer rotor and an inner stator, the stator including a plurality of teeth, each tooth having a top side, a bottom side and opposing walls extending between the top and bottom sides, powder coat insulation covering the top side, the bottom side and the walls, an annular end cap coupled to one side of the stator, the end cap including a channel guide and at least one wire routing element spaced radially outward from the channel guide, and wire extending around and contacting the powder coat insulation on the top side, bottom side and walls of the teeth and routed by the channel guide and the at least one wire routing element, wherein the at least one wire routing element includes a prong.

14. The machine of claim 13 wherein the electric machine is an appliance motor.

15. The machine of claim 13 wherein the routing element includes a plurality of prongs spaced along an outer periphery of the annular end cap.

16. The machine of claim 13 wherein the end cap is a first end cap, the stator further comprising a second end cap substantially identical to the first end cap coupled to a second side of the stator.

17. The machine of claim 13 wherein the end cap includes a plurality of routing elements spaced radially outward from the channel guide.

18. The machine of claim 17 wherein the plurality of routing elements include a plurality of prongs.

19. The machine of claim 18 wherein the end cap further includes at least one wire coupling terminal.

20. The machine of claim 19 wherein the wire coupling terminal is positioned between opposite ends of the channel guide.

21. The machine of claim 13 wherein the end cap includes an outer perimeter and the channel guide extends along at least a portion of said outer perimeter.

22. A method of manufacturing a stator having a plurality of stator teeth, the method comprising coating a top side and a bottom side of each stator tooth with an electrically insulating material, coupling an electrically non-conductive annular end cap having a continuous substantially smooth peripheral edge and a plurality of routing elements spaced around the peripheral edge to one side of the stator, the plurality of routing elements including a channel guide and at least one prong spaced radially outward from the channel guide, winding magnet wire around each tooth, the magnet wire contacting the electrically insulating coating on the top and bottom sides of each tooth, and routing the magnet wire between selected teeth utilizing the routing elements.

23. The method of claim 22, further comprising electrically terminating the magnet wire at a wire coupling terminal of the end cap, the wire coupling terminal connectable to a wire connector of an electric machine in which the stator is to be utilized.

24. The method of claim 22 wherein the end cap Is a first end cap, the method further comprising coupling a second end cap, substantially identical to the first end cap, to a second side of the stator.

* * * * *